United States Patent
Atluri et al.

(10) Patent No.: US 9,440,654 B2
(45) Date of Patent: Sep. 13, 2016

(54) HYBRID VEHICLE AND METHOD OF CONTROLLING A HYBRID VEHICLE WITH MODE SELECTION BASED ON LOOK AHEAD DATA

(71) Applicant: GM GLOBAL TECHNOLOGY OPERATIONS LLC, Detroit, MI (US)

(72) Inventors: Venkata Prasad Atluri, Farmington Hills, MI (US); Matias Garibaldi, Royal Oak, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

(21) Appl. No.: 14/208,396

(22) Filed: Mar. 13, 2014

(65) Prior Publication Data

US 2015/0258984 A1    Sep. 17, 2015

(51) Int. Cl.
*B60W 40/06* (2012.01)
*B60W 10/06* (2006.01)
(Continued)

(52) U.S. Cl.
CPC ............ *B60W 30/181* (2013.01); *B60K 6/485* (2013.01); *B60W 10/02* (2013.01); *B60W 10/06* (2013.01); *B60W 10/08* (2013.01); *B60W 10/10* (2013.01); *B60W 10/26* (2013.01); *B60W 20/11* (2016.01); *B60W 30/188* (2013.01); *B60W 30/18018* (2013.01); *B60W 30/18072* (2013.01); *B60W 30/18154* (2013.01); *B60W 50/0097* (2013.01); *B60W 2050/0024* (2013.01); *B60W 2550/12* (2013.01); *B60W 2550/143* (2013.01); *B60W 2550/22* (2013.01); *Y02T 10/6286* (2013.01); *Y10S 903/93* (2013.01)

(58) Field of Classification Search
CPC .......... B60W 20/1088; B60W 10/06; B60W 10/08; B60W 10/26
USPC .......................................................... 701/22
See application file for complete search history.

(56) References Cited

U.S. PATENT DOCUMENTS 6,909,201 B2    6/2005 Murty et al.
7,590,477 B2    9/2009 Loeffler
(Continued)

FOREIGN PATENT DOCUMENTS

EP    1932704 B1    10/2011

OTHER PUBLICATIONS

Akitomo Kume and Masayoshi Takahashi; entitled: Mazda i-ELOOP Brake Energy Regeneration System and Strategy; aabc europe advanced automotive battery conference; dated Jun. 27, 2013; 20 pages.
(Continued)

*Primary Examiner* — John Q Nguyen
*Assistant Examiner* — Anshul Sood
(74) *Attorney, Agent, or Firm* — Quinn Law Group, PLLC

(57) ABSTRACT

A method of controlling a hybrid vehicle having a hybrid powertrain with an engine and a motor/generator includes receiving data indicative of anticipated future vehicle operating conditions, and determining via a controller optimal operating parameters for the engine and for the motor/generator based at least partially on the data. A controller then commands a powertrain operating strategy for the engine and the motor/generator based on the determined optimal operating parameters. The data received can be from active onboard sensing systems and from vehicle telematics systems.

18 Claims, 6 Drawing Sheets

(51) Int. Cl.
*B60W 30/18* (2012.01)
*B60W 10/08* (2006.01)
*B60W 10/26* (2006.01)
*B60W 50/00* (2006.01)
*B60K 6/485* (2007.10)
*B60W 10/02* (2006.01)
*B60W 10/10* (2012.01)
*B60W 30/188* (2012.01)

(56) References Cited

U.S. PATENT DOCUMENTS

| | | | |
|---|---|---|---|
| 8,005,587 | B2 | 8/2011 | Tamor et al. |
| 8,036,785 | B2 | 10/2011 | Maguire et al. |
| 8,260,481 | B2 | 9/2012 | Naik et al. |
| 8,374,740 | B2 | 2/2013 | Druenert et al. |
| 8,392,105 | B2 | 3/2013 | Desborough |
| 8,543,272 | B2 | 9/2013 | Yu et al. |
| 2002/0188387 | A1 | 12/2002 | Woestman et al. |
| 2012/0286052 | A1 | 11/2012 | Atluri et al. |
| 2013/0066492 | A1 | 3/2013 | Holmes et al. |
| 2013/0172147 | A1* | 7/2013 | Razaznejad ......... F16H 61/0213 477/77 |
| 2013/0304362 | A1* | 11/2013 | Santoso ................ F02D 41/042 701/113 |

OTHER PUBLICATIONS

Rainer Knorr, Markus Gilch, Jurgen Auer and Christoph Wieser; entitled: Stabilization of the 12 V Onboard Power Supply—Ultracapacitors in Start-stop Systems; ATZelektronik worldwide Edition; http://www.atzonline.com/Article/12124/Stabilization-of-the-12-V-Onboard-Power-Supply-%E2%80%93-Ultracapacitors-in-Start-stop-Systems.html; dated May 2010; pp. 5.

* cited by examiner

HYBRID VEHICLE AND METHOD OF CONTROLLING A HYBRID VEHICLE WITH MODE SELECTION BASED ON LOOK AHEAD DATA

TECHNICAL FIELD

The present teachings generally include a hybrid vehicle and a method of controlling a hybrid vehicle.

BACKGROUND

Hybrid electric vehicles utilizing both an electric motor/generator and an internal combustion engine as power sources have an onboard controller programmed to vary use of each of the engine and motor/generator during different driving conditions. Generally, a controller receives input signals from vehicle sensors that monitor current operating conditions. The controller executes various algorithms to determine a desired functional mode of the powertrain. The ability of the powertrain to function as desired is dependent in part upon the speed and accuracy of adaptation to changing operating conditions.

SUMMARY

A method of controlling a hybrid vehicle is provided that can function more efficiently due to its ability to command an operating strategy that is based on a variety of input data indicative of future vehicle operating conditions, also referred to herein as forecasted, predicted, or anticipated vehicle operating conditions. By considering not only the current vehicle operating conditions, but also conditions likely at different points in time in the future, vehicle systems can be controlled to take advantage of opportunities for power and energy savings, and an optimal operating strategy can be implemented. By controlling the vehicle according to the method, an adaptive energy management strategy is realized that can improve fuel economy, drivability and durability.

More specifically, a method of controlling a hybrid vehicle having a hybrid powertrain with an engine and a motor/generator includes receiving data indicative of future vehicle operating conditions, and determining via a controller optimal operating parameters for the engine and for the motor/generator based at least partially on the data. The controller then commands a powertrain operating strategy for the engine and the motor/generator based on the determined optimal operating parameters. The data received can include a first set of data received from one or more active onboard sensing systems. For example, radar-based systems can be used that provide a range and range rate between vehicles. Additionally, the controller can receive a second set of data from one or more vehicle telematics systems that provide information such as, by way of non-limiting example, route congestion, weather, three-dimensional map data, and the like.

The operating strategy commanded by the controller may be a different functional mode of operation than that in which the powertrain is currently operating. The input data can be used by the controller for many purposes, such as to update calibration parameters of various algorithms, to extend timers on or inhibit transmission shift algorithms, to implement opportunity charging in the event of an anticipated auto-stop, to execute a fuel cut-off algorithm in the event of an anticipated vehicle deceleration, coasting, or cruising, to update stored energy loss values or regenerative power values associated with different operating modes, and to update stored gains for vehicle components, such as state-of-charge threshold values for implementing charging of an energy storage device, gains of actuators, and/or gains of a motor power inverter module. A vehicle is also disclosed herein that has one or more active sensing systems and one or more telematics systems and a controller configured to utilize data provided from the systems to implement the method.

In one embodiment, the controller commands a functional operating mode of an engine and of a motor/generator operatively connectable to a crankshaft of the engine via a belt drive train to establish a driving connection therebetween. The functional operating mode is commanded based at least partially on the first set of data and the second set of data.

The above features and advantages and other features and advantages of the present teachings are readily apparent from the following detailed description of the best modes for carrying out the present teachings when taken in connection with the accompanying drawings.

DETAILED DESCRIPTION

Figure 1:
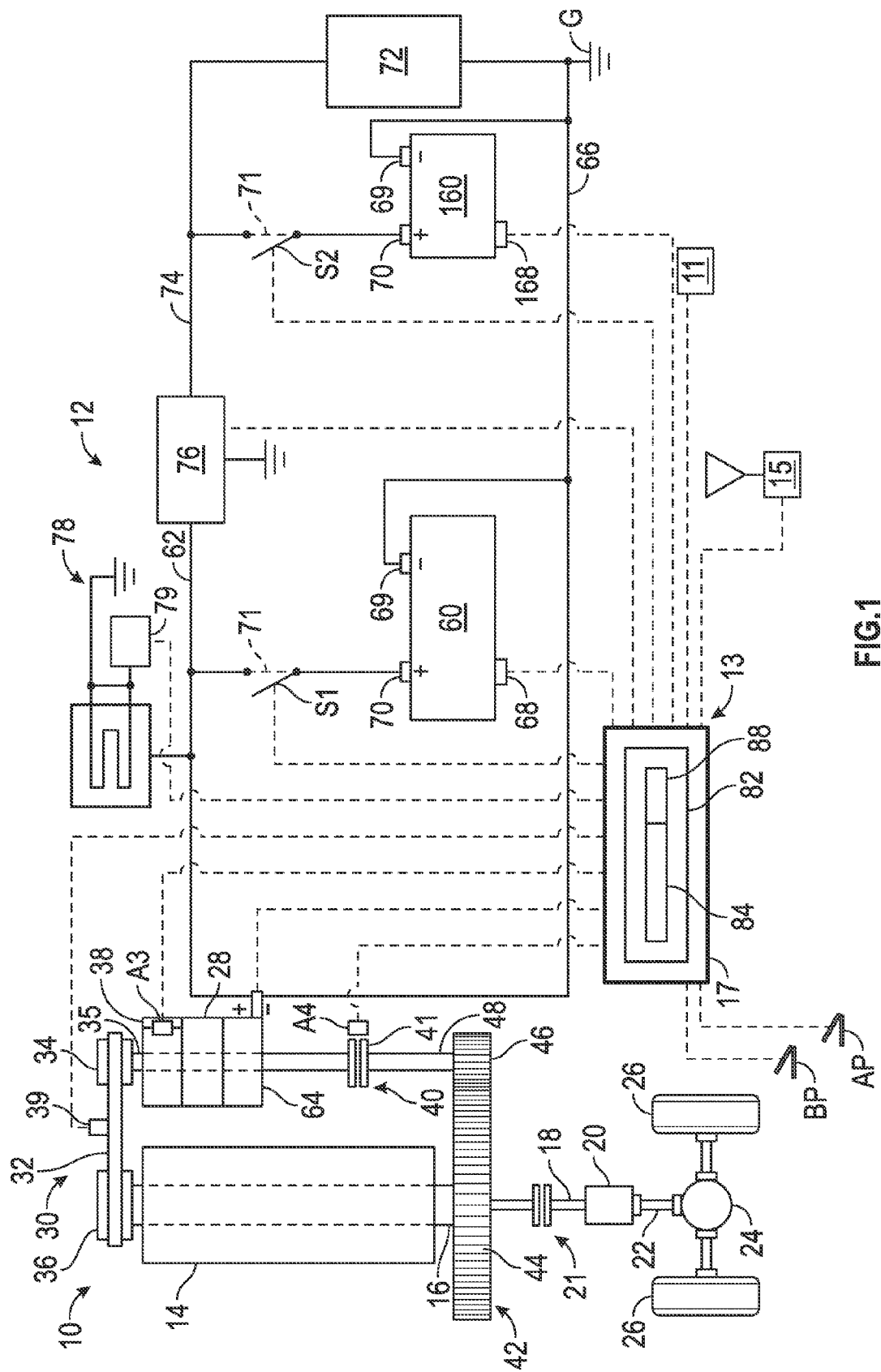
FIG. 1 is a schematic illustration of a portion of a first vehicle having a first embodiment of a hybrid powertrain and a control system.

Referring to the drawings, wherein like reference numbers refer to like components throughout the several views, FIG. 1 shows a hybrid vehicle 10 that has a hybrid powertrain 12. The hybrid vehicle 10 also has a control system 13 with an electronic controller 17. The hybrid vehicle 10 has one or more onboard active sensing systems 11 that provide a first set of data to the controller 17 that is indicative of future vehicle operating conditions, which may be referred to herein as forecasted, predicted, or anticipated vehicle operating conditions. The data may include proximity signals regarding other vehicles, such as proximal vehicles 10A and 10B in FIG. 2. The hybrid vehicle 10 of FIG. 1 also has one or more telematics systems 15 that provide a second set of data to the vehicle controller 17 that is indicative of additional future vehicle operating conditions, such as vehicle proximity, traffic, geographical, and other information, as further discussed herein. Other onboard components, such as but not limited to energy storage devices ESS1 60 and ESS2 160, and a vehicle accelerator pedal AP and brake pedal BP provide input signals to the controller 17 indicative of current vehicle operating conditions.

The hybrid powertrain 12 with an engine 14 and a motor/generator 28, both of which are operable to provide propulsion power to the vehicle 10. As described herein, the controller 17 executes one or more stored algorithms that use the data received from the active sensing systems 11 and the telematics systems 15 to determine optimal engine 14 and motor/generator 28 operating parameters. A powertrain operating strategy for the engine 14 and the motor/generator 28 is then commanded based at least partially on the optimal engine and motor/generator operating parameters.

Referring to FIG. 1, the hybrid vehicle 10 is shown in greater detail. Although the hybrid vehicle 10 shown has a starter generator arrangement, as further described herein, the method 100 of FIG. 4, controlling a hybrid vehicle to command a powertrain operating strategy using data from onboard active sensing systems 11 and from telematics systems 15, can be used with any hybrid vehicle configuration.

More specifically, with reference to FIG. 1, the engine 14 may be an internal combustion engine 14, and has an output member, such as a crankshaft 16, operatively connectable to an input member 18 of a transmission 20 by a selectively engageable clutch 21. The clutch 21 may be a normally closed clutch or a normally open clutch. The transmission 20 includes a gearing arrangement and clutches (not shown) through which torque flows from the input member 18 to an output member 22 and through a final drive 24 to vehicle wheels 26 to propel the vehicle 10. The wheels 26 shown may be front wheels or rear wheels. A second pair of wheels that is not shown may also be powered by the powertrain 12, or may be unpowered.

The hybrid powertrain 12 is a fossil fuel-electric hybrid powertrain because, in addition to the engine 14 as a first power source powered by fossil fuel, such as gasoline or diesel fuel, the electric motor/generator 28 powered by stored electrical energy is available as a second power source. The motor/generator 28 is controllable to function as a motor or as a generator and is operatively connectable to the crankshaft 16 of the engine 14 via a belt drive train 30. The belt drive train 30 includes a belt 32 that engages with a pulley 34 connectable to rotate with a motor shaft 35 of the motor/generator 28 and engagement with a pulley 36 connected to rotate with the crankshaft 16. When the pulley 34 is connected to rotate with the motor/generator 28, the belt drive train 30 establishes a driving connection between the motor/generator 28 and the crankshaft 16. The motor/generator 28 may be referred to as a belt-alternator-starter motor/generator. Alternatively, the drive train 30 may include a chain in lieu of the belt 32 and sprockets in lieu of the pulleys 34, 36. Both embodiments of the belt drive train 30 are referred to herein as a "belt drive train".

A selective coupling device 38 is operatively connected to the control system 13 and is controllable to selectively establish a driving connection between the crankshaft 16 and the motor/generator 28 through the belt drive train 30. The selective coupling device 38 may be a normally engaged (i.e., normally closed) clutch that engages the motor shaft 35 to rotate commonly (i.e., together and in unison with) the pulley 34. An actuator A3 can be activated by a control signal from the control system 13 to selectively open or disengage the coupling device 38, so that the motor shaft 35 is then not in a driving connection with the crankshaft 16.

Additionally, a variable tensioner system 39 may be used to adjust the tension between the belt 32 and the pulleys 34, 36. The tensioner system 39 can be electronically, hydraulically, or otherwise actuated. The control system 13 is operatively connected to the tensioner system 39 and can control the tensioner system 39 with a control signal. By controlling the tension, the torque transfer between the belt 32 and the pulleys 34, 36, and thus between the motor/generator 28 and the crankshaft 16 can be adjusted.

A starter mechanism 40 is controllable by the control system 13 to selectively establish a driving connection to the crankshaft 16 through a gear train 42 separately from any driving connection through the belt drive train 30. Specifically, the starter mechanism 40 includes a selectively engageable clutch 41, an actuator A4, and the gear train 42. The clutch 41 is selectively engaged by movement of the actuator A4 when the actuator A4 is activated. Engagement of the clutch 41 establishes a driving connection between the motor/generator 28 and the crankshaft 16. The actuator A4 can be a linear actuator, such as an electromechanical linear solenoid actuatable when electronically activated with an electronic control signal received from the control system 13. Other potential configurations of the actuator A4, by way of non-limiting example, can include an electric motor driving a ball-screw mechanism, a shape-memory alloy actuator, an electro-active polymer actuator, etc. For the shape-memory alloy actuator, selectively energizing the material, such as the alloy, can change the shape of the material which causes the clutch 41 to engage. For the electro-active polymer actuator, selectively energizing the material, such as the polymer, can change the shape of the material to engage the clutch 41. Movement of the actuator A4 can, for example, allow hydraulic pressure to engage the clutch 41.

The gear train 42 includes an external gear 44, such as a ring gear on a flywheel that rotates with the crankshaft 16. A pinion gear 46 is supported to rotate with a shaft 48 and meshes with the external gear 44. The pinion gear 46 is referred to as a first gear of the gear train 42, and the external gear 44 is referred to as a second gear of the gear train 40. Torque is thus transferred between the motor/generator 28 and the crankshaft 16 through the gear train 42 only when actuator A4 is activated, so that clutch 41 is engaged, connecting the motor shaft 35 with the shaft 48.

The hybrid powertrain 12 includes a first energy storage device ESS1 60 that can store and provide electrical energy along a first voltage bus 62, referred to as a high voltage bus, at a voltage compatible with that required for powering the motor/generator 28. Specifically, the ESS1 60 may be a battery or battery module rated for a relatively high nominal voltage, such as, by way of non-limiting example, 24 VDC. The ESS1 60 is operable within a first range of operating voltage that includes the nominal voltage. The specific operating voltage of the ESS1 60 within the first range of operating voltage at any point in time is dependent in part on a state-of-charge and a temperature of the ESS1 60.

The motor/generator 28 may have a stator with multi-phase windings requiring alternating current. A motor power inverter module (MPIM) 64 can be controlled by the control system 13 and configured to convert between DC voltage at the bus 62 and three-phase power required by and generated by the motor/generator 28. The motor/generator 28 and ESS1 60 are grounded to a common ground G via a ground connection 66. The ESS1 60 has a battery management system (BMS1) 68 that includes a variety of sensors and is in operative communication with the control system 13 to provide operating data indicative of current vehicle operating conditions such as the state-of-charge and temperature of the ESS1 60.

A negative terminal 69 of the ESS1 60 is connected to ground G. A positive terminal 70 is only selectively connected to the high voltage bus 62. Specifically, a switching device S1 is operatively connected to the control system 13 and is controllable by a control signal from the control system 13 to establish a closed or ON position, shown in phantom as 71, or an open or OFF position shown. In the ON position, switching device S1 establishes electrical communication between the ESS1 60 and the motor/generator 28 via the high voltage bus 62 and the MPIM 64. The switching device S1 can be a unidirectional or bidirectional blocking switch, or a solid-state switch. In some embodiments, the switching device S1 can also be controlled to establish a linear mode of operation in which the the ESS1 60 is in electrical communication with the motor/generator 28, but the voltage from the ESS1 60 is modified (i.e., reduced) depending on a position of the switching device S1 between closed and open. The switching device S1 allows the hybrid powertrain 12 to be controlled so that there is no continuous connection between any electrical energy storage device and the motor/generator 28.

An auxiliary electrical system 72 is operatively connected to a second voltage bus 74 and is grounded to the ground G. The auxiliary electrical system 72 may include one or more vehicle accessory devices installed on the vehicle 10 that are configured to operate within a range of voltages different than or the same as the voltage supplied on the bus 62 by the ESS1 60 or by the motor/generator 28. For example, the auxiliary electrical system 72 can include headlights, HVAC devices, auxiliary motors, entertainment system components, etc. A selective connection between the bus 62, and the bus 74 and auxiliary electrical system 72 can be established by a selective connecting device, such as a DC-DC converter 76 that is configured to step down voltage from the bus 62 to the bus 74. For example, the bus 74 can be a 12V bus, in which case the optional DC-DC converter is used to provide stable voltage to all or select electrical loads of the accessory devices of the auxiliary electrical system 72 if the voltage level of the ESS1 60 provided at the bus 62 deviates significantly from that of a standard 12V bus (e.g., <10V or >16V). Alternatively another switching device may be used as a selective connecting device in place of the DC-DC converter 76. The DC-DC converter 76 (or switching device) is operatively connected to the control system 13 and controlled according to the loads of the auxiliary electrical system 72 and other vehicle operating conditions provided to the control system 13. Still further, the DC-DC converter 76 may be eliminated if the electrical loads of the accessory devices in the auxiliary electrical system 72 are within the range of voltages provided on the bus 62.

The hybrid powertrain 12 includes a second energy storage device ESS2 160 operatively connected to the control system 13 via a battery management system BMS2 168. The ESS2 160 can be rated for a relatively low nominal voltage, such as, by way of non-limiting example, 12 VDC. The ESS2 160 is operable within a second range of operating voltage that includes the nominal voltage. The second range of operating voltage may be lower than the first range of operating voltage of the ESS1 60. The specific operating voltage of the ESS2 160 within the second range of operating voltage at any point in time is dependent in part on a state-of-charge and a temperature of the ESS2 160.

The powertrain 12 also includes a second switching device S2 that is controllable by a control signal from the control system 13 to establish a closed or ON position, shown in phantom as 71, or an open or OFF position shown. The switching device S2 can be a unidirectional or bidirectional blocking switch, or a solid-state switch. In some embodiments, the switching device S2 can also be controlled to establish a linear mode of operation.

In the ON position, the switching device S2 establishes electrical power flow between the positive terminal 70 of the ESS2 160 and the motor/generator 28 via the buses 62 and 74, and the DC-DC converter 76 is operating to provide a step in voltage between the buses 62 and 74. In the ON position, the switching device S2 also establishes electrical power flow between the positive terminal 70 of the ESS2 160 and the auxiliary electrical system 72 via the bus 74. Electrical power flow between ESS2 160 and the motor/generator 28 is thus in parallel with electrical power flow between the motor/generator 28 and the auxiliary electrical system 72. The ESS2 160 is grounded at the negative terminal 69 to ground connection 66.

An auxiliary solar power system 78 can be installed on the vehicle 10. The auxiliary solar power system 78 is in operative communication with the bus 62, and with the control system 13. The auxiliary solar power system 78 can provide electrical energy to the bus 62, for assisting with electrical power requirements of the hybrid powertrain 12. The auxiliary solar power system 78 can include photovoltaic sources such as one or a plurality of interconnected individual solar cells, solar laminate film, solar cured glass, surface coatings, and/or other photovoltaic devices. The control system 13 can determine the electrical power available from the auxiliary solar power system 78 and photovoltaic (solar) power source(s). Photovoltaic sources may include one or a plurality of interconnected individual solar cells, solar laminate film, solar cured glass, surface coatings, and/or other photovoltaic devices. The auxiliary solar power system 78 with photovoltaic sources generating electricity may be mounted on any surface of vehicle 10 that may potentially be incident to the sun. The maximum amount of energy generated or power outputted by the auxiliary solar power system 78 may be a predetermined amount based on the amount of solar irradiance incident on the photovoltaic sources. The solar irradiance may be measured by a photovoltaic source or independently using one of several types of stand-alone pyranometers such as thermopile-based, silicon photodiode-based, or other type of measurement device.

The auxiliary solar power system 78 may be electrically connected to provide electrical energy to the bus 62, such as to store energy generated thereby in ESS1 60 when the switching device S1 is controlled to establish an electrical connection between the bus 62 and the ESS1 60. The auxiliary solar power system 78 may also include an integral power control unit, such as an integrated voltage modifying device 79 that can be a DC-DC converter that is controlled to convert the voltage provided by the photovoltaic sources to the voltage range of the bus 62 and to selectively connect the auxiliary solar power system 78 with the bus 62.

The control system 13 is operable to control the hybrid powertrain 12 to establish various operating modes. More specifically, the control system 13 includes at least one electronic controller 17 that includes at least one processor 82 that executes one or more stored algorithms 84 based on various vehicle and powertrain inputs and the first and second sets of data from the onboard active sensing systems 11 and from the vehicle telematics system 15. The controller 17 generates control signals in accordance with the stored algorithms 84 that establish multiple operating modes of the hybrid powertrain 12.

The electronic controller 17 may be configured as a single or distributed control device that is electrically connected to or otherwise placed in hard-wired or wireless communication with each of the onboard active sensing system(s) 11, the vehicle telematics system(s) 15, the accelerator pedal AP, the brake pedal BP, the engine 14, the transmission 20, the wheels 26, the motor/generator 28 and the MPIM 64 thereof, the actuators A3, A4, the ESS1 60, the switching device S1, the auxiliary solar power system 78, the DC-DC converter 76, and the auxiliary electrical system 72 via control channels, some of which are indicated with dashed lines in FIG. 1. The control channels may include any required transfer conductors, for instance a hard-wired or wireless control link(s) or path(s) suitable for transmitting and receiving the necessary electrical control signals for proper power flow control and coordination aboard the vehicle 10. In one embodiment, the telematics system(s) 15 can include any data device, such as a smart phone, and the controller 17 can also receive look ahead data from the data device via an onboard transfer conductor that may be referred to as a data tube or pipe.

The electronic controller 17 includes one or more control modules, with one or more processors 82 and tangible, non-transitory memory 88, e.g., read only memory (ROM), whether optical, magnetic, flash, or otherwise. The electronic controller 17 may also include sufficient amounts of random access memory (RAM), electrically-erasable programmable read only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller 17 can be a host machine or distributed system, e.g., a computer such as a digital computer or microcomputer, acting as a vehicle control module, and/or as a proportional-integral-derivative (PID) controller device having a processor, and, as the memory 88, tangible, non-transitory computer-readable memory such as read-only memory (ROM) or flash memory. Therefore, the controller 17 can include all software, hardware, memory 88, algorithms 84, connections, sensors, etc., necessary to monitor and control the hybrid powertrain 12. As such, one or more control methods executed by the controller 17 can be embodied as software or firmware associated with the controller 17. It is to be appreciated that the controller 17 can also include any device capable of analyzing data from various sensors, comparing data, and making decisions required to control the hybrid powertrain 12.

Figure 3:
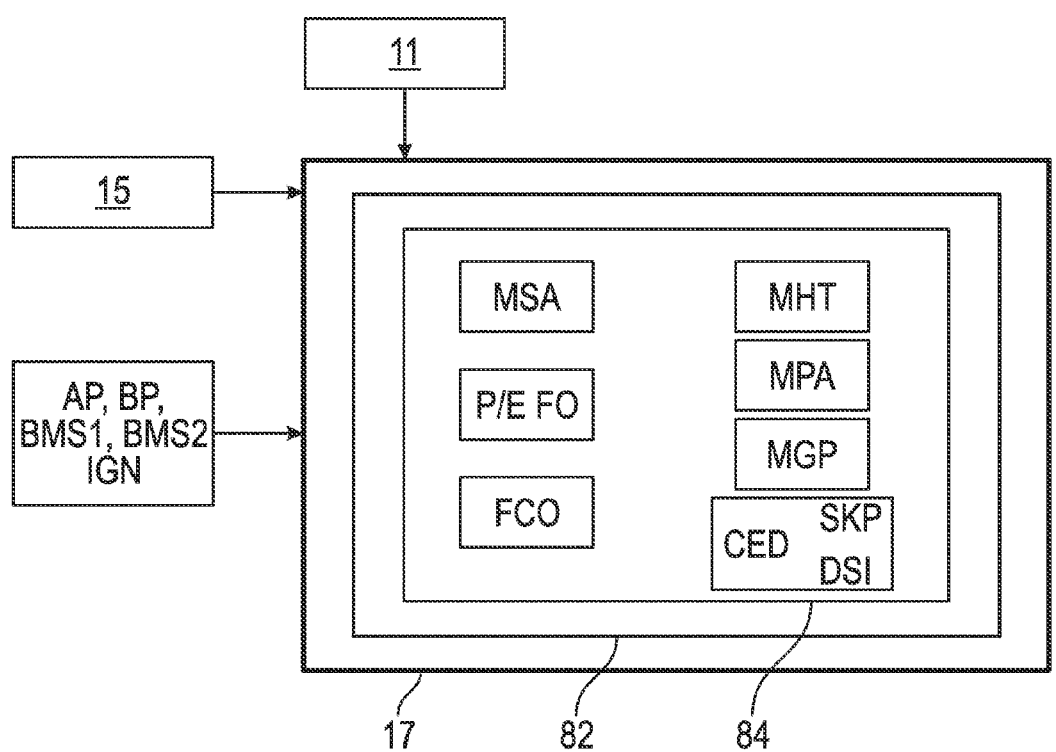
FIG. 3 is a schematic illustration of a portion of the control system for the vehicle, and an onboard active sensing system and a telematics system in operative communication with the control system.

One schematic illustration of the electronic controller 17 is depicted in FIG. 3, showing various functional algorithms 84 stored on and executed by the one or more processors 82 of the one or more electronic control modules. For example, the controller 17 has one or more control modules or processors 82 that carry out multiple stored algorithms 84 to determine and implement control and optimization of vehicle propulsion via the powertrain 12. In the embodiment shown, the algorithms 84 include a mode selection algorithm (MSA) executed to determine or select one of many available operating modes based at least in part on various vehicle operating conditions, including operating parameters of the powertrain 12. A change of modes according to the MSA may be based in part on stored reference values, also referred to as calibration parameters, calibrations or gains, for mode hold timers, for entry and exit conditions of opportunity charging of ESS1 60 and/or ESS2 160, for auto-stop or auto-start activation, for state-of-charge thresholds for ESS1 60 and/or ESS2 160, for actuators A3 and/or A4, for the MPIM 64, and for a throughput strategy of ESS1 60 and/or ESS2 160.

Other algorithms executed by the control system 13 include a power/energy flow optimizer P/E FO that considers power losses associated with utilizing the motor/generator 28 and the ESS1 60, based in part on stored reference values for energy loss and power, calibrations or gains. A fuel cut-off mode control algorithm (FCO) determines control signals for cutting fuel to the engine 14 and allowing the crankshaft 16 to freewheel. A mode hold timer (MHT) algorithm can be controlled to vary the length of time that various powertrain modes are held, based on current or forecasted (i.e., predicted) vehicle operating conditions. A multiplexing algorithm (MPA) may be included that enables the motor/generator 28 to provide multiple output voltages. A motor/generator preparation algorithm (MGP) prepares the motor/generator 28 for hybrid operating modes to be commanded. A clutch engagement/disengagement algorithm (CED) includes and implements logic for control of clutches or other torque-transmitting devices (not shown) in the transmission 20, and for control of the clutch 21. The CED algorithm includes a skip shift (SKP) algorithm and a downshift inhibit (DSI) algorithm. The CED algorithm can include predetermined shift times of the transmission 20.

Various vehicle operating conditions are provided as input signals, also referred to herein as data, to the electronic controller 17. Some of the input signals are indicated as arrows directed to the controller 17 in FIG. 3. For example, FIG. 3 shows that input signals from the active onboard sensing system(s) 11 are provided to the controller 17. For example, the active onboard sensing system(s) 11 may utilize radar, and the input signals may include, for example, vehicle range and range rate, which are the distance, and the rate of change in the distance, from the vehicle 10 to an adjacent vehicle 10A or 10B of FIG. 2. Input signals from the vehicle telematics system(s) 15 are also provided to the controller 17. These signals may include, for example, the existence and/or content of upcoming road signs (RS), the existence and/or status of upcoming traffic light (TL) signals, the relative upcoming congestion on current or alternate travel routes (RD), the status of other upcoming traffic conditions on current or alternate travel routes, three-dimensional map data for current or alternate routes, such as vehicle grade data, current and future weather data, and the distance to a predetermined destination.

Other onboard components also provide data as input signals to the controller 17. For example, the battery management systems BMS1 68 and BMS2 168 can provide a state-of-charge (SOC), a temperature, current, voltage, and other information regarding the ESS1 60 and the ESS2 160 the controller 17. Hysteresis bands, i.e., permitted operating ranges of various powertrain components, such as a range of state-of-charge (i.e., a minimum and a maximum threshold for charging), of the ESS1 60 and ESS2 160 can be provided to or stored on the controller 17. Wake up signals to the controller 17 upon key insertion or other actuation of the vehicle ignition, and engine ignition position signals such as crank or run can be provided as input to the controller 17. A torque request made by a vehicle operator, via a vehicle onboard component such as the accelerator pedal AP or the brake pedal BP is also provided as an input indicative of current vehicle operating conditions. An estimated or measured torque and/or speed of the motor/generator 28 can be an input to the controller 17. Additionally, any other current operating parameters or state of any other onboard components of the vehicle 10, including components of the hybrid powertrain 12, can be input signal to the controller 17 indicative of current vehicle operating conditions.

Some of the data received as input signals to the controller 17 can be categorized as short-term look ahead data, as it is data indicative of current operating conditions and/or of vehicle operating conditions forecasted for the relatively near future, which can be within a predetermined amount of time. Short-term input signals include the range and rage rate, the temperature of the components, the grade of the current route, the traffic light TL signals, and the current state of the components and onboard devices. Other data received as input signals to the controller 17 can be categorized as long-term look ahead data, as it may be indicative of vehicle operating conditions forecasted for further into the future. Long-term input signals include future traffic conditions, distance to destination, three-dimensional map data, including gradability, and weather.

Referring again to FIGS. 1 and 3, the mode control scheme established by the mode selection algorithm MSA 84 indicates that when the powertrain 12 is in an engine ignition off mode EO, and the control system 13 is initialized when a key is inserted in the ignition or the ignition is otherwise actuated, to establish a system initialization SYS INIT mode in which the actuator A4 is activated, the switching device S2 is closed if predetermined state-of-charge requirements of ESS1 60 and/or ESS2 160, as well as predetermined temperature requirements are met. The powertrain 12 is thus prepared for starting the engine 14 in a first key start mode KS1 when the ignition is closed.

Alternatively, a second key start mode KS2 could instead be established by closing switching device S1 instead of switching device S2, such as when predetermined state-of-charge and temperature requirements of the ESS1 60 and ESS2 160 are satisfied for the predetermined levels required for the second key start mode KS2 but not for the first key start mode KS1. Following either of the key start modes KS1 or KS2, the vehicle operating conditions as indicated by the input signals to the controller 17 will most likely result in the establishment of a torque boost mode TB II, in which actuator A3 is controlled so that coupling device 38 is engaged, and in which the first switching device S1 is closed so that the motor/generator 28 can receive energy from ESS1 60 and operate as a motor to assist the engine 14 in providing tractive torque to the vehicle wheels 26.

Alternatively, after either key start mode KS1 or KS2, or following an auto-start mode AST, the control system 13 can establish a first torque boost mode TB1 in which actuator A3 is controlled so that coupling device 38 is engaged and both switching devices S1 and S2 are closed so that energy from both ESS1 60 and ESS2 160 can be used in powering the motor/generator 28 as a motor to assist the engine 14 in satisfying vehicle torque demands. Once the vehicle 10 reaches desired operating speeds, the motor/generator 28 can be operated as a generator with actuator A3 controlled so that coupling device 38 is engaged and either or both switching devices S1, S2 are closed to allow recharging of ESS1 60 or ESS2 160 in a generating mode.

During vehicle travel in either of the torque boost modes TB1 or TBII, or in the corresponding generating modes, if input signals to the controller 17 indicate that slowing of the crankshaft 16 is desired, any one of multiple different regenerative braking modes can be established with the actuator A3 controlled so that coupling device 38 is engaged, and the switching device S1 is closed. The switching device S2 may or may not be closed depending upon predetermined required state-of-charge levels and temperatures of ESS1 60 and ESS2 160. In the regenerative braking mode(s), there is no driving connection to the crankshaft 16 through the starter mechanism 40.

If input signals to the controller 17 indicate that the vehicle 10 has slowed to less than a predetermined speed, then the auto-stop mode ASTP can be established by activating actuator A4 and closing switching device S1. During the auto-stop mode ASTP, the auxiliary electrical system 72 can be powered with energy from ESS1 60. With actuator A4 activated, the powertrain 12 is prepared to establish an auto-start mode AST when vehicle torque demand is indicated by brake pedal BP input or accelerator pedal AP input. In the auto-start mode AST, the motor/generator 28 is controlled to function as a motor to provide torque to the crankshaft 16 to start the engine 14. Alternatively, if after the vehicle 10 slows below the predetermined speed, the ignition is turned off, the control system 13 again establishes the engine ignition off EO mode.

With the engine 14 started, the actuator A4 can be deactivated to prevent a driving connection to the crankshaft 16 through the starter mechanism 40. The actuator A3 can be controlled to disconnect the motor/generator 28 from the pulley 34, and the engine 14 can be on in an engine-only operating mode of the powertrain 12. Alternatively, the actuator A3 can be controlled so that torque is transferred from the shaft 35 to the pulley 34 and the motor/generator 28 is controlled to function as a motor to assist the engine 14, using energy from the ESS1 60 in a torque boost mode similar to TB II of FIG. 8.

During engine operation, with actuator A3 controlled so that torque is transferred from the shaft 35 to the pulley 34 and the switching device S1 closed, if the state-of-charge of the ESS1 60 is below a predetermined level, and the torque demand of the powertrain 12 is met sufficiently by the engine 14, the motor/generator 28 can be controlled to function as a generator in a generating mode, using power from the engine 14 to accomplish opportunity charging of the ESS1 60. Additionally, in a regenerative braking mode, the motor/generator 28 is controlled to operate as a generator to slow the crankshaft 16 while recharging the ESS1 60, if predetermined state-of-charge and temperature levels of the ESS1 60 are satisfied. The state-of-charge and temperature level requirements for the regenerative braking mode can be different than those required for the torque boost modes TBI, TBII.

Once the vehicle 10 has slowed to a vehicle speed less than a predetermined threshold, the auto-stop mode ASTP can be established by the control system 13 for a stop of relatively short duration, such as at a traffic light TL, if the state-of-charge of the ESS1 60 and the temperature of the ESS1 60 meet predetermined levels, which can be the same predetermined levels as required for the key start mode. In the auto-stop mode, the engine 14 is off (i.e., fuel is cut off), and the switching device S1 is closed so that ESS1 60 can power the vehicle accessory devices via the auxiliary electrical system 72. The actuator A4 is also activated, so that the motor/generator 28 can quickly drive the crankshaft 16 through the starter mechanism 40 when the control system 13 transitions the powertrain 12 to the auto-start mode AST.

Once operating conditions indicate engine start is desired, such as by release of the vehicle brake pedal BP or depression of the vehicle accelerator pedal AP following an auto-stop, the control system 13 establishes the AST mode by controlling the motor/generator 28 as a motor to turn the crankshaft 16 through the starter mechanism 40 if the state-of-charge of the ESS1 60 and temperature of the ESS1 60 meet predetermined levels. Once the engine 14 is started, the control system 13 then establishes the engine-only operating mode, a torque boost mode, or a regenerative braking mode as needed to meet torque demand and to satisfy state-of-charge requirements of the ESS1 60. When the vehicle speed drops below the predetermined threshold and if the engine ignition is off, then the control system 13 returns the hybrid powertrain 12 to engine-off EO mode.

Figure 2:
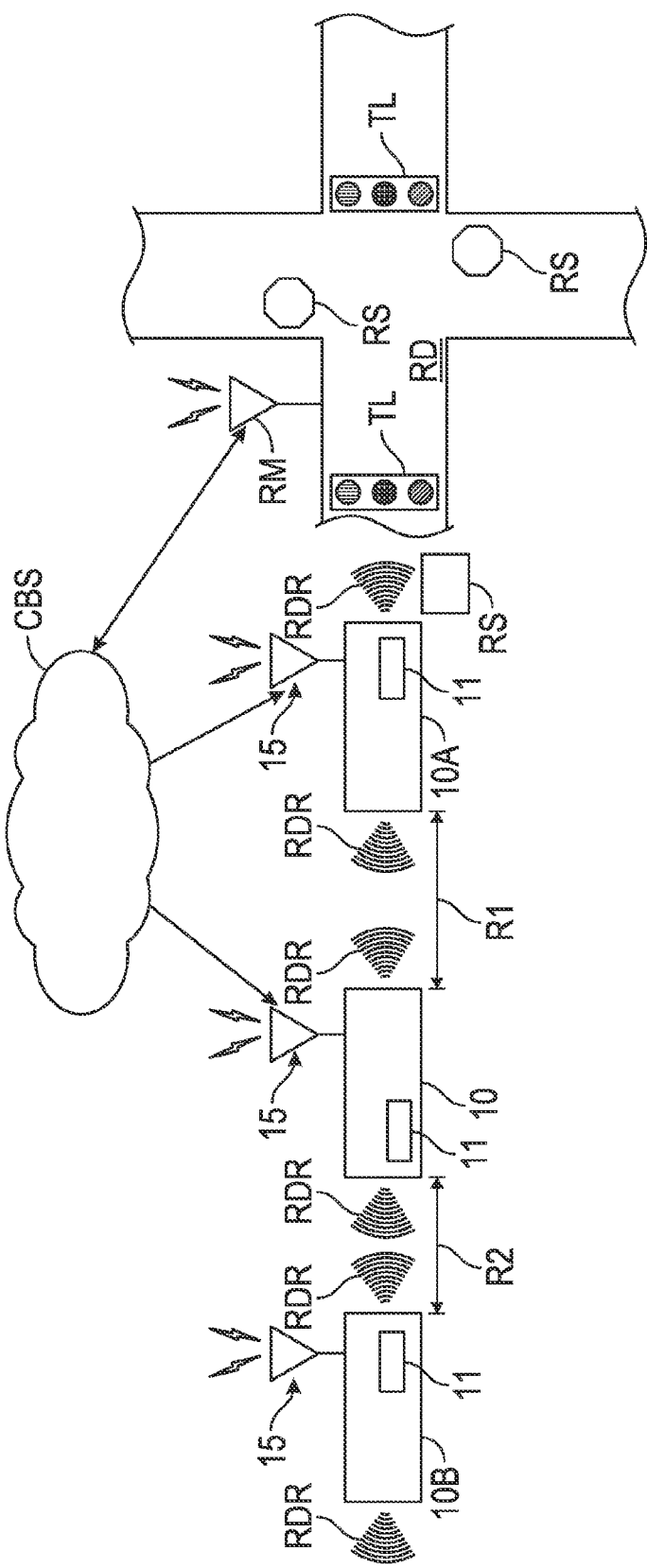
FIG. 2 is a schematic illustration of the first vehicle of FIG. 1 in an operating environment including other vehicles.

FIG. 2 illustrates that the hybrid vehicle 10 can use radar RDR or other sensing mechanisms of the onboard active sensing systems 11 to determine the range R1 or R2, which are the distances between the vehicle 10 and the proximate vehicles 10A, 10B respectively. Onboard vehicle systems can also be used to determine a road load demand, such as based on signals from the accelerator pedal AP or the brake pedal BP. The onboard vehicle systems can determine the current operating state of devices, such as the current state-of-charge of ESS1 60 and ESS2 160. Other vehicle operating conditions, such as the temperature of the ESS1 60 and ESS2 160 can also be determined.

FIG. 2 also illustrates that the vehicle telematics systems 15 receive information from cloud-based systems CBS such as global positioning systems and sensing systems that receive information from remote monitors RM, such as road sign RS data, traffic light TL information, and traffic data such as route congestion, traffic updates, and three-dimensional maps from which gradability is determined.

Figure 4:
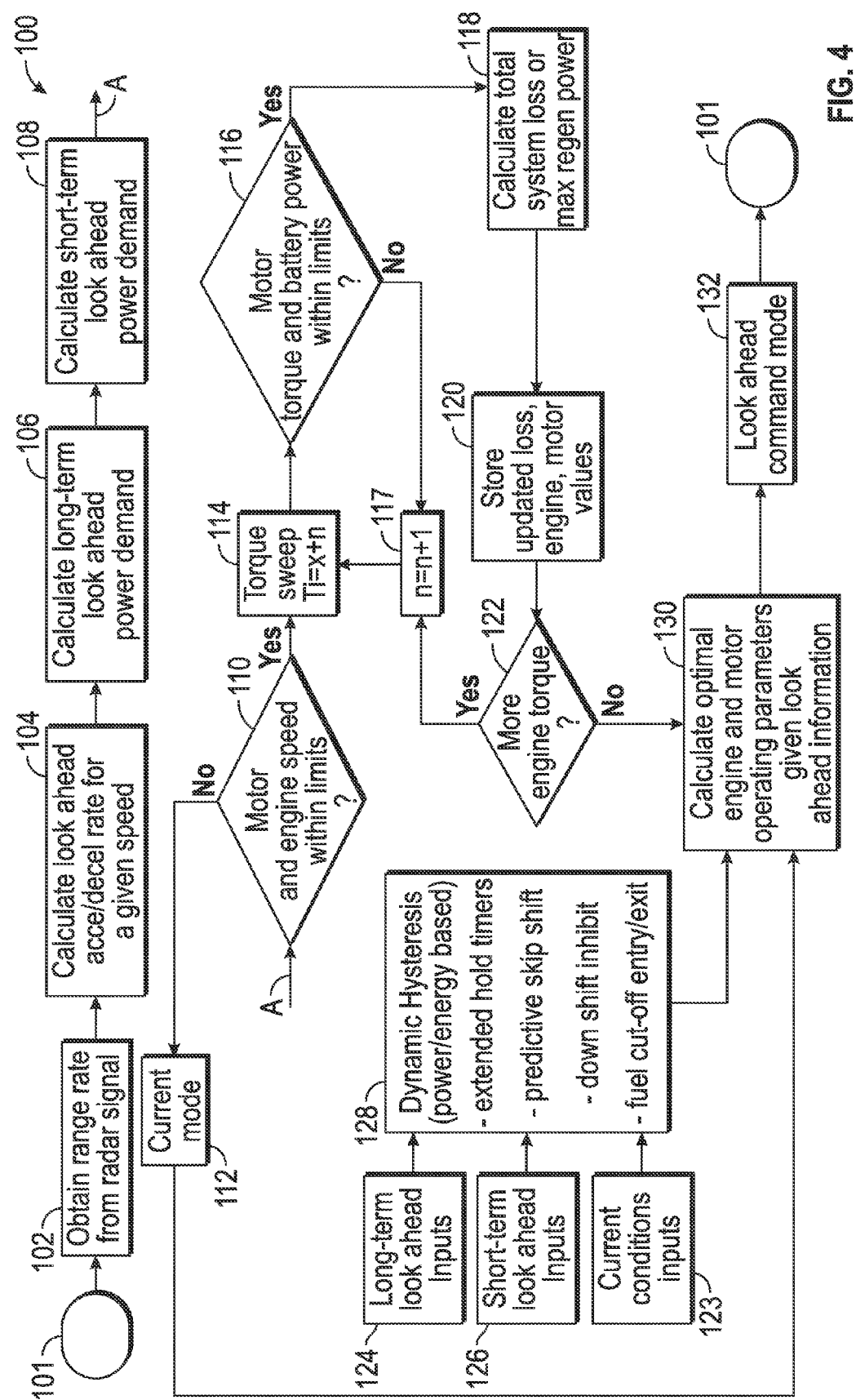
FIG. 4 is a schematic flow diagram of a method of controlling the vehicle of FIG. 1.

FIG. 4 is a schematic flow diagram of a method 100 of commanding an operating strategy of the powertrain 12 using the controller 17 and using look ahead data received from the onboard active sensing systems 11, and from the vehicle telematics system(s) 15, and vehicle operating conditions from onboard vehicle components such as the accelerator pedal AP, the brake pedal BP, the battery management systems BMS1 68 and BMS2 168, from the ignition IGN, from the motor/generator 28, from the engine 14, and/or from other vehicle components or systems.

The method 100 begins at start 101 and moves to step 102, with the onboard active sensing system 11 obtaining a range rate from a radar signal RDR, such as a range rate of vehicle 10 approaching vehicle 10A. Based on the range rate, the controller 17 then calculates in step 104 a forecasted future acceleration or deceleration rate for a given vehicle speed (the current vehicle speed), also referred to as a look ahead acceleration/deceleration.

In step 106, the controller 17 calculates a long-term look ahead power demand based on the scheduled route, the grade (also referred to as gradability) of the scheduled route, expected traffic, and other data received from the vehicle telematics system(s) 11. Based on the calculated acceleration or deceleration rate, as well as based on other short-term look ahead data such as temperature and state-of-charge of ESS1 60 and ESS2 160, the current vehicle grade, and traffic light TL signals, in step 108, the controller 17 calculates a short-term look ahead power demand for the powertrain 12.

After step 108, the method 100 moves to step 110, as indicated by reference character A. In step 110, the controller 17 determines whether the speed of the motor/generator 28 and the speed of the engine crankshaft 16 would remain within predetermined limits that are, for example, efficiency limits for the motor 28 and engine 14, as well as noise limits, if the short-term and long-term look ahead power demands of steps 106 and 108 were satisfied according to the method 100. If the speeds are not within the predetermined limits, then the controller 17 will not attempt to achieve the short-term and long-term look ahead power demands according to the method 100, and will instead control the powertrain 12 to remain in the current operating mode in step 112.

However, if the motor 28 and engine 14 speed limits are satisfied, then the method 100 moves to step 114, in which the controller 17 determines the torque of the motor/generator 28 and the power of the ESS1 60 and ESS2 160 required for a different operating mode to which the powertrain 12 could potentially be transitioned to from the current operating mode, such as an operating mode with a gear state (i.e., such as an upshift or downshift to a different transmission gear ratio) and/or a motor/generator state different from that of the current operating mode. This determination may be referred to as a torque sweep.

In step 116, the controller 17 determines whether the torque required of the motor/generator 28 and the power required from the ESS1 60 and ESS2 160 would be within predetermined limits, which are stored in look-up tables, if the hybrid powertrain 12 was operating in the specific operating mode evaluated in step 114 and was controlled to satisfy the calculated short-term and long-term look ahead power demands under the method 100.

If it is determined in step 116, that the torque required of the motor/generator 28 and the power required from the ESS1 60 and ESS2 160 would be within the predetermined limits, then the method 100 moves to step 118. In step 118, the method 100 calculates the system loss of the powertrain 12 or maximum regenerative power possible if the powertrain 12 operates in the operating mode for which step 116 is satisfied. Stored reference values for overall system loss, maximum regenerative power, and the associated engine speed, motor speed and motor torque required for satisfying the short-term and long-term look ahead power demands are then updated in reference tables in step 120. A stored set of gains, i.e., thresholds, for the ESS1 60 and/or the ESS2 160, as well as for any or all of the actuators A3, A4, and the MPIM 68, required for the short-term and long-term look ahead power demands are also updated in step 120. The overall system loss is based on the fuel required of the engine 14, and the charge required of ESS1 60 and/or ESS2 160 to satisfy the short-term and long-term look ahead power demands.

If however, it is determined in step 116 that the the torque required of the motor/generator 28 and the power required from ESS1 60 and ESS2 160 would not be within predetermined limits, then the method 100 does not update the reference values in the look-up tables, and instead determines in step 117 an alternate potential operating mode, and returns to step 114 to perform a torque sweep of the new potential operating mode, evaluating in step 116 whether the the torque required of the motor/generator 28 and the power required from the ESS1 60 and ESS2 160 would be within predetermined limits if operating in the new potential operating mode.

For each alternate operating mode for which the motor torque and battery power limits are satisfied in step 116, the total system loss or maximum regenerative power associated with operating in that mode is calculated in step 118, and the stored reference values for overall system loss or maximum regenerative power, as well as the associated engine speed, motor speed and motor torque required for satisfying the short-term and long-term look ahead power demands if operating in that mode are then updated in reference tables in step 120.

After updating the reference values for a potential alternate mode in step 120, the method 100 determines in step 122 whether more engine torque is still available than would be used in that mode, and, if so, returns to step 117 to determine the next optional operating mode, then to step 114 to perform a torque sweep for that mode, and repeats steps 116, 118, 120, and 122 until it is determined in step 122 than no more engine torque is available beyond that which would be required for the operating mode examined in the most recent torque sweep. At this point, all potential operating modes for meeting the short-term and long-term look ahead power demands have been evaluated and reference values for losses and other stored values have been updated.

Simultaneously with carrying out steps 102-122, the method 100 is receiving data from onboard components indicative of the current operating conditions in step 123, such as data from BMS1 68 and BMS2 168 regarding the current state-of-charge and temperatures for the ESS1 60 and ESS2 160. The controller 17 is also receiving input data indicative of long-term look ahead vehicle operating conditions in step 124, and input data indicative of short-term look ahead vehicle operating conditions in step 126. A first set of the data, which may include some of the long-term look ahead inputs 124 and some of the short-term look ahead inputs 126, is from the onboard active sensing system(s) 11. A second set of the data, which may include some of the long-term look ahead inputs 124 and some of the short-term look ahead inputs 126, is from the vehicle telematics system(s). "Long-term" and "short-term" look ahead vehicle operating conditions, as used herein, are relative terms. Both indicate conditions likely to occur in the future, with long-term look ahead vehicle operating conditions being further in the future than short-term look ahead vehicle operating conditions.

Using the data received as inputs to the controller 17 in steps 123, 124, and 126, the controller 17 updates various ones of the stored algorithms 84 used to control the hybrid powertrain 12, such as by updating the gains, calibrations, or hysteresis bands used in the algorithms. For example, the stored reference values that are power or energy based, such as those for mode hold timers, for entry and exit conditions of opportunity charging of ESS1 60 and/or ESS2 160, for auto-stop ASTP or auto-start AST activation, for state-of-charge thresholds (gains) for ESS1 60 and/or ESS2 160, and for a throughput strategy of ESS1 60 and/or ESS2 160 can be updated based on the inputs received in steps 123, 124, and 126. As more specifically discussed with respect to FIG. 5, the maximum state-of-charge threshold for the ESS1 60 and the ESS2 160 can be increased when the look ahead data indicates that forecasted future operating conditions include an extended standstill, thus enabling a longer auto-stop ASTP period. As mores specifically discussed with respect to FIG. 6, the entry and exit conditions for the fuel cut-off mode control algorithm (FCO) are updated based on the inputs received in steps 123, 124, and 126. For example, when the look ahead data indicates that the forecasted future operating conditions include a deceleration to a standstill or casting or cruising conditions, the fuel cut-off can be commanded earlier than it would have been if no look ahead data were available, thus saving additional fuel.

Moreover, if the look ahead data indicates that the vehicle 10 is soon to reach a destination, as may be determined with the telematics system(s) 15, the mode hold timers for operation in a mode that utilizes the ESS1 60 or the ESS2 160 can be extended, as greater depletion of the ESS1 60 and/or the ESS2 160 may be permitted given the knowledge that the ESS1 60 and/or ESS2 160 can be recharged at the destination.

If the look ahead data indicates that the motor/generator 28 may be used in the near future, such as for opportunity charging, the motor/generator preparation algorithm (MGP) that prepares the motor/generator 28 for hybrid operating modes can command preparation of the motor/generator 28 for the upcoming mode, such as by activating the switches and energizing the field of the motor/generator 28. Moreover, if the look ahead data indicates that acceleration or deceleration is forecasted, the clutch engagement/disengagement algorithm (CED) may be able to better predict and utilize the skip shift (SKP) algorithm and/or the downshift inhibit (DSI) algorithm. The skip shift (SKP) algorithm skips a sequential gear state to more rapidly address forecasted future operating conditions such as lower acceleration.

Following completion of steps 122 and 128, the method 100 moves to step 130, in which the controller 17 calculates the optimal operating parameters for the engine 14 and the motor/generator 28 based at least partially on the input data of steps 123, 124, and 126. The optimal operating parameters may be those that maximize system efficiency. In other words, in step 130, the controller 17 determines the optimal operating parameters utilizing those ones of the algorithms 84 of step 128 that are triggered by the input data received, and as those algorithms have been updated according to the input data. The controller 17 also accesses the updated system loss and regenerative power values of step 120.

Based on the optimal values determined in step 130, the controller 17 then commands an operating mode based at least partially on the optimal operating parameters, and therefore based at least partially on the short-term and long-term look ahead data and calculations of steps 102, 106, 108, 124 and 126. The operating mode may be a different functional operating mode than the current functional operating mode of the hybrid powertrain 12, such as, by way of non-limiting example, a switch from a torque-boost mode to a generator mode. Alternatively or in addition, the look ahead command mode may be a commanded opportunity charging of the ESS1 60 and/or the ESS2 160, or a commanded engine fuel cut off (FCO) mode. Following step 132, the method 100 returns to the start at 101.

As discussed, if it is determined in step 110 that the motor and engine speeds would not be within predetermined limits if the long-term look ahead power demand of step 106 and/or the short-term look ahead power demand of step 108 were satisfied, then the controller 17 commands that the powertrain 12 remain in the current operating mode in step 112. The method 100 then moves directly to step 130, and the optimal engine and motor operating parameters are calculated based on operating in the current mode and based on the look ahead information of steps 123, 124, and 126 as discussed above.

Figure 5:
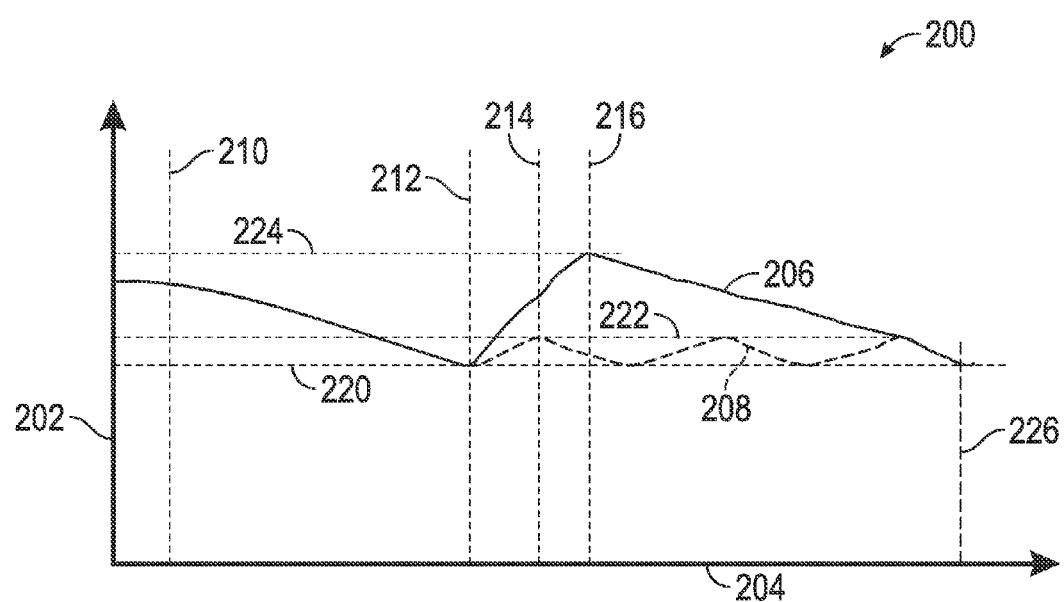
FIG. 5 is a graph of state-of-charge of an energy storage device of the vehicle of FIG. 1 versus time in seconds with the vehicle controlled according to the method of FIG. 4, and a graph of the state-of-charge of the same energy storage device when the vehicle is not controlled according to the method.

FIG. 5 shows a graph 200 of state-of-charge 202 of the ESS1 60 versus time 204 in seconds with the vehicle 10 at zero speed, such as due to traffic. The graph 200 illustrates the benefits of the method 100, as an aggressive opportunity charging mode is undertaken in light of the look ahead data inputs. More specifically, plot 206 is the state-of-charge of the ESS1 60 in the vehicle 10 using the method 100, and plot 208 is a reference state-of-charge of the ESS1 60 of a baseline vehicle under a typical start-stop control method that does not have the benefit of the look ahead data. From time 0 seconds to time at 212, the state-of-charge of the ESS1 60 is the same under either methodology. At time 210, auto-stop ASTP is enabled under either methodology, such as in response to the vehicle 10 being below a threshold speed for a predetermined period of time. With the engine 14 stopped, the state-of-charge of the ESS1 60 drops until a predetermined minimum state-of-charge 220 is met. Under both methodologies, the auto-start AST mode is activated, with the engine 14 started and the motor/generator 28 controlled to function as a generator to charge the ESS1 60. However, the vehicle 10 that has the controller 17 that implements method 100 has the benefit of the long-term look ahead data received, for example, from the vehicle telematics system(s) 15 via the remote monitor RM and the cloud based system CBS. The long-term look ahead data indicates that the vehicle 10 is likely to be at a standstill for an extended period of time. With this information, the hysteresis bands of the state-of-charge limits are updated to increase the maximum state-of-charge limit from 222 to 224. The vehicle 10 thus remains in the auto-start AST mode until time 216, with the engine 14 running at a higher load, which is a more efficient operating parameter for the engine 14, until the updated maximum state-of-charge 224 is reached. With the higher state-of-charge, the vehicle 10 can then remain in the auto-stop mode ASTP until time 226, when the ESS1 60 reaches the minimum state-of-charge 220, at which point auto-start AST mode can be re-established, if the vehicle 10 still remains at a standstill. By contrast, the baseline vehicle operates according to plot 208, without the benefit of the long-term look ahead data. The maximum state-of-charge is not updated, and remains at 222 for the baseline vehicle. This necessitates an auto-stop ASTP at time 214, earlier than the auto-stop ASTP at time 216 for the vehicle 10. Additional auto-starts and auto-stops are cyclically enabled with multiple cycles necessary between time 212 and 226, which decreases energy efficiency in comparison to only one cycle required between time 212 and time 226 for the vehicle 10.

Figure 6:
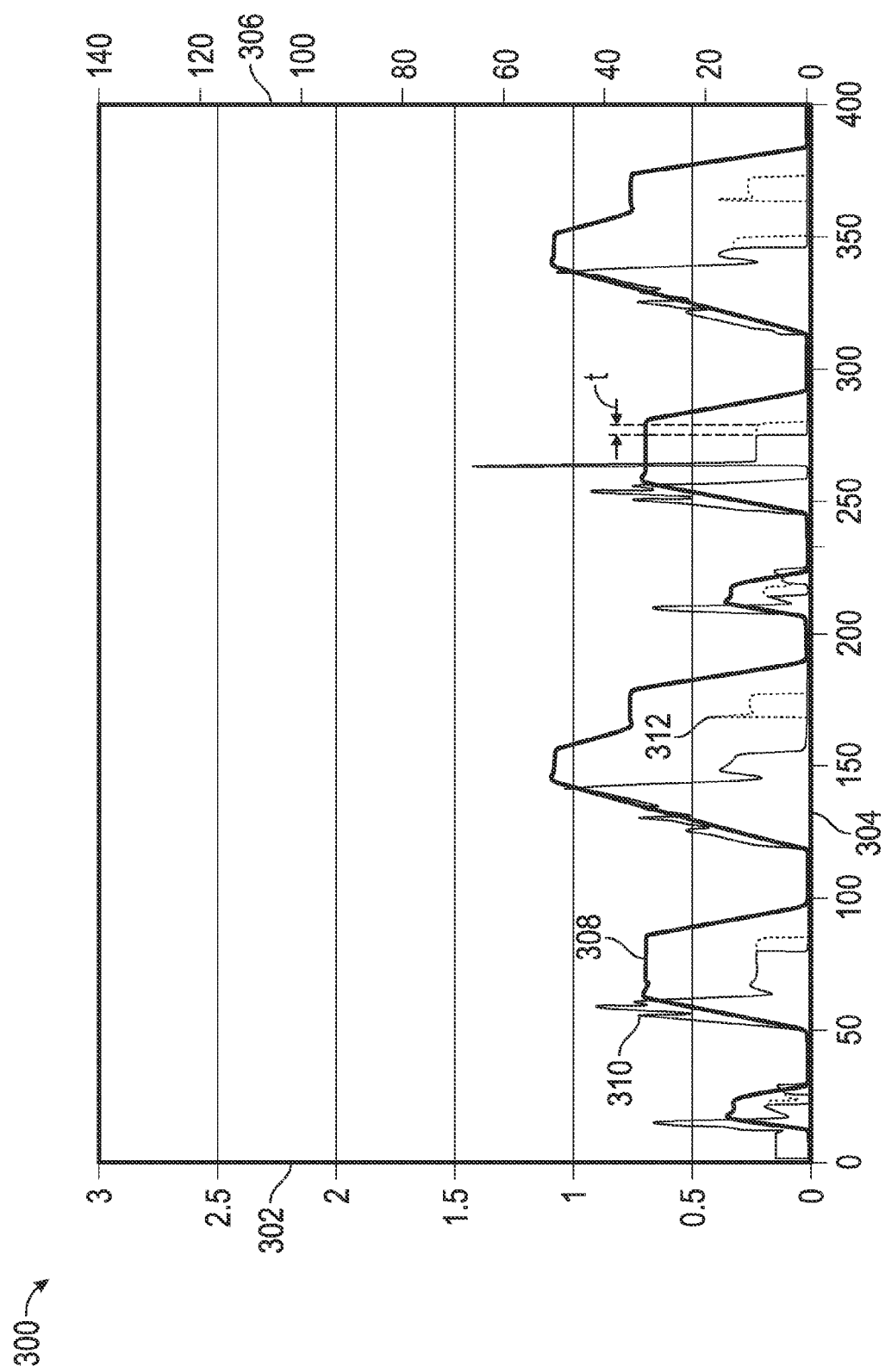
FIG. 6 is a graph of fuel rate in grams per second of an engine versus time in seconds of the vehicle of FIG. 1 controlled according to the method of FIG. 4, and a graph of the fuel rate of the same engine when the vehicle is not controlled according to the method, and showing vehicle speed in kilometers per hour.

FIG. 6 shows a graph 300 of fuel rate 302 of the engine 14 in grams per second and vehicle speed in kilometers per hour of the vehicle 10 versus time 304 in seconds. The graph 300 illustrates the benefits of the method 100, as an early fuel cut-off mode is undertaken in light of the knowledge of likely future operating conditions gained from the look ahead data. Plot 308 shows the speed of the vehicle 10. Plot 310 is the fuel rate of the engine 14 in the vehicle 10 using the method 100, and plot 312 is a reference fuel rate of a baseline vehicle under a typical fuel cut-off algorithm without the benefit of look ahead knowledge. For portions of time where the plot 312 is not apparent in FIG. 6, it coincides with plot 310. With the benefit of look ahead data, the vehicle 10 is able to command the fuel cut-off (FCO) mode earlier than the baseline vehicle for each vehicle deceleration, and in fact preceding the actual vehicle deceleration, as indicated by time period t, which is the increased amount of time that the fuel is cut-off prior to just one deceleration of the vehicle 10 relative to the typical vehicle. In contrast, the vehicle that does not implement the method 100 commands fuel cut-off only at the actual start of each deceleration. The fuel savings for vehicle 10 is the product of the fuel rate and the time differential t. The total fuel savings for the vehicle 10 with the controller 17 that implements the method 100 is the sum of the fuel savings at each deceleration.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of controlling a hybrid vehicle having a hybrid powertrain with an engine, a motor/generator, and an energy storage device that provides electrical energy to the motor/generator; the method comprising:
   receiving data indicative of anticipated future vehicle operating conditions, including an expected acceleration or deceleration event;
   calculating acceleration or deceleration associated with the expected acceleration or deceleration event for a given vehicle speed;
   calculating power demanded for the calculated acceleration or deceleration;
   calculating expected energy losses or expected regenerative power for each one of different functional operating modes of the powertrain for which motor/generator torque and power of the energy storage device would remain within predetermined limits for the power demanded; wherein said calculating is based at least partially on the data;
   updating a stored database of energy loss values and regenerative power values with said calculated expected energy losses or expected regenerative power;
   determining via a controller optimal operating parameters for the engine and for the motor/generator based at least partially on the data;
   wherein said determining optimal operating parameters based on the data is based at least partially on the calculated expected energy losses or expected regenerative power in the stored database; and
   commanding a powertrain operating strategy for the engine and the motor/generator based on the determined optimal operating parameters.

2. The method of claim 1, wherein the data includes a first set of data from onboard active sensing systems; and
   wherein the data further includes a second set of data from vehicle telematics systems.

3. The method of claim 1, wherein said commanding a powertrain operating strategy is commanding a change to a different one of the functional operating modes than a current functional operating mode of the powertrain.

4. The method of claim 1, further comprising:
   prior to said determining optimal operating parameters, updating a stored set of gains for at least one of the energy storage device, one or more actuators operable to operatively connect the motor/generator with the engine, and a motor power inverter module for the motor/generator; and wherein said updating is based at least partially on the data.

5. The method of claim 1, prior to said determining optimal operating parameters, updating stored reference values used in a stored skip shift algorithm; wherein said updating is based at least partially on the data.

6. The method of claim 1, prior to said determining optimal operating parameters, updating stored reference values used in a stored transmission clutch engagement/disengagement algorithm; wherein said updating is based at least partially on the data.

7. The method of claim 1, prior to said determining optimal operating parameters, updating entry and exit conditions of a stored engine fuel cut-off mode algorithm; wherein said updating is based at least partially on the data.

8. The method of claim 1, wherein said commanding a powertrain operating strategy is implementing charging of the energy storage device that provides electrical energy to the motor/generator; and wherein the data indicates an expected auto-stop mode.

9. The method of claim 1, wherein said commanding a powertrain operating strategy is implementing an engine fuel cut-off mode; and wherein the data indicates an expected deceleration, coasting, or cruising of the vehicle.

10. The method of claim 1, further comprising:
    receiving additional data indicative of current vehicle operating conditions from onboard components; wherein the additional data includes at least one of vehicle torque demand, a state-of-charge of the energy storage device that provides electrical power to the motor/generator, temperature of the energy storage device, and a current state of one or more actuators activatable to establish at least one of the functional operating modes of the powertrain.

11. The method of claim 1, wherein the data includes at least one of distance to a proximal vehicle and rate of change of the distance to the proximal vehicle, road sign data, traffic data, route congestion data, weather data, and three-dimensional map data.

12. The method of claim 1, wherein said received data is from at least one of an onboard active sensing system and a vehicle telematics system.

13. A method of controlling a hybrid vehicle having a hybrid powertrain with an engine and a motor/generator, and with an energy storage device operatively connected to the motor/generator that provides electrical energy to the motor/generator, wherein the motor/generator is selectively connected to a crankshaft of the engine via a belt drive train; the method comprising:
receiving a first set of data from onboard active sensing systems; wherein at least some of said first set of data is indicative of future vehicle operating conditions;
receiving a second set of data from vehicle telematic systems; wherein at least some of said second set of data is indicative of additional future vehicle operating conditions;
calculating power demanded based at least partially on the first set of data and the second set of data;
calculating expected energy losses or expected regenerative power for each one of different functional operating modes of the powertrain for which motor/generator torque and power of the energy storage device would remain within predetermined limits for the power demanded; and
commanding via a controller one of the functional operating modes of the engine and of the motor/generator; wherein said one of the functional operating modes is a torque boost mode in which the motor/generator provides torque to the crankshaft via the belt drive train and is commanded based at least partially on the first set of data and the second set of data.

14. The method of claim 13, further comprising:
commanding a generator mode in which the motor/generator functions as a generator to charge the energy storage device; and wherein at least one of the first set of data and the second set of data indicates the future vehicle operating conditions include an auto-stop mode in which the vehicle speed will be below a threshold speed and the engine will be shut off.

15. The method of claim 13, wherein at least one of the first set of data and the second set of data indicates the future vehicle operating conditions include vehicle deceleration, coasting, or cruising; and wherein the commanded functional operating mode includes controlling the engine to cut off fuel to the engine.

16. A hybrid vehicle comprising:
a hybrid powertrain with an engine and a motor/generator each operable to provide propulsion power to the vehicle;
a control system operatively connected to the engine and the motor/generator and configured to control the engine and the motor/generator in different operating modes;
at least one of a vehicle onboard active sensing system and a vehicle telematics system operable to provide data indicative of future vehicle operating conditions, wherein the control system includes a processor configured to execute a stored algorithm that:
determines optimal operating parameters for the engine and for the motor/generator based at least partially on the data and further based at least partially on stored reference values of at least one of energy loss or regenerative power associated with each powertrain operating mode for which a predetermined motor torque limit of the motor/generator and a predetermined battery power limit of an energy storage device used to power the motor/generator are satisfied; and
commands a powertrain operating strategy for the engine and the motor/generator based on the determined optimal operating parameters.

17. The hybrid vehicle of claim 16, wherein said determining via a controller optimal operating parameters is further based on at least one of:
at least one actuator operable to operatively connect the motor/generator with the engine; and
a motor power inverter module for the motor/generator.

18. The hybrid vehicle of claim 16, prior to said determining optimal operating parameters, updating stored reference values used in a stored algorithm affecting powertrain performance; wherein said updating is based on the data.

* * * * *